Aug. 11, 1959  S. C. ROCKAFELLOW  2,898,801
INSPECTION DEVICE FOR DETECTING DIFFERENCES IN TWO OBJECTS
Filed June 9, 1955  4 Sheets-Sheet 1

INVENTOR.
STUART C. ROCKAFELLOW
BY
ATTORNEY

Aug. 11, 1959 S. C. ROCKAFELLOW 2,898,801
INSPECTION DEVICE FOR DETECTING DIFFERENCES IN TWO OBJECTS
Filed June 9, 1955 4 Sheets-Sheet 2

INVENTOR.
STUART C. ROCKAFELLOW
BY
ATTORNEY

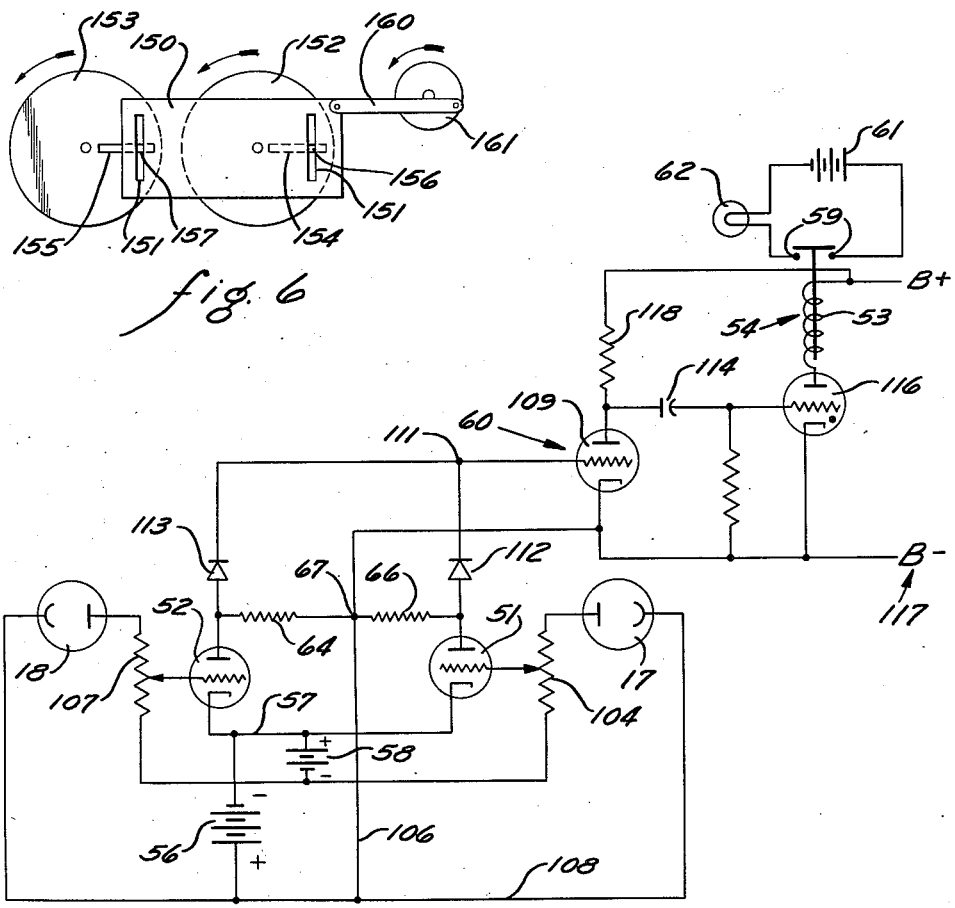
fig. 6
fig. 7
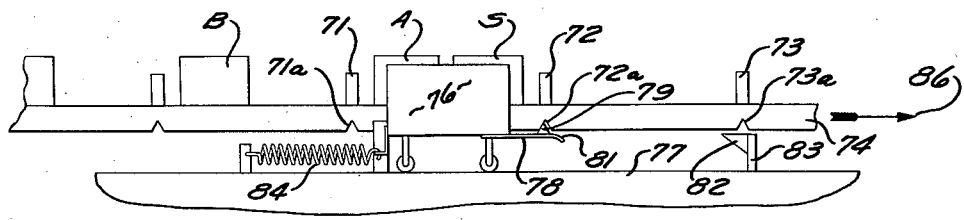
fig. 8

United States Patent Office 2,898,801
Patented Aug. 11, 1959

2,898,801

INSPECTION DEVICE FOR DETECTING DIFFERENCES IN TWO OBJECTS

Stuart C. Rockafellow, Farmington, Mich., assignor to Robotron Corporation, Detroit, Mich., a corporation of Michigan Application June 9, 1955, Serial No. 514,337

7 Claims. (Cl. 88—14)

This invention relates to an inspection device and more particularly it relates to a device for comparing an article being inspected with an article, or photograph of an article, having previously approved structural characteristics.

It is conventional practice to employ inspection operations at various selected points in a manufacturing process. The use of a human inspector is, however, often not reliable where complex articles are being manufactured or where the articles are manufactured at a high rate of production. A further drawback to the use of a human inspector is the expense involved which may make the inspection cost per unit produced prohibitively high.

Mechanical inspection devices heretofore utilized have been unsatisfactory for a number of reasons. Some devices have been too delicate for factory operation. Other devices have been so complicated that construction and maintenance of them has been more expensive than the use of human inspectors. The prior art devices have, in still other instances, been incapable of operating at the high speeds which some industries require.

An additional difficulty with some prior devices has been their inability to make a complete and thorough inspection of the parts of a complex manufactured article. Other prior devices were incapable of adaptation to inspection of articles of varying sizes or articles produced at different speeds. Still other prior art devices failed to provide means for adjusting the sensitivity of the inspection device so that it could be used to inspect articles where slight deviations from the desired article would still be acceptable.

Accordingly, it is an object of this invention to provide an inspection device of simple and rugged construction.

A further object of this invention is the provision of an inspection device capable of rapid operation.

A further object of this invention is to provide an inspection device capable of effecting detailed inspection of the parts of a complex article.

A further object of this invention is to provide a device which is capable of inspecting articles of various sizes and articles produced at varying rates of speed.

A further object of this invention is to provide an inspection device where the sensitivity of the inspection device may be readily adjusted, and wherein such adjustment may be through a wide range.

A further object of the invention is to provide an inspection device whose sensitivity may be varied merely by changing the speed of rotation of the scanning discs, and wherein variations in the speed of rotation of the scanning discs will have no effect other than changing the sensitivity of the device and the speed at which an inspection operation is carried out.

A further object of this invention is to provide an inspection device which is capable of comparing the article being inspected with a standard.

A further object of this invention is to provide an inspection device with an alarm system whereby a desired signal will be actuated if a given article being inspected does not conform to the standard, either by the addition of an extra part or the omission of a required part.

Other objects and purposes of this invention will be apparent to persons acquainted with this type of equipment upon reading of the following disclosure and inspection of the accompanying drawings:

In the drawings:

Figure 6 is a schematic view of a modification.

Figure 7 is a circuit diagram of one possible circuit for use in the device.

Figure 8 is a schematic drawing indicating one method for causing the inspection device to travel with a conveyor on which the article being inspected is carried.

*General description*

As used in this specification and the claims appended hereto, the term "standard" means a complete, correctly constructed article or some image thereof, such as a photograph, which is suitable for use in this inspection device and against which the article being inspected may be compared. The term "test article" refers to the article being inspected.

Figure 1:
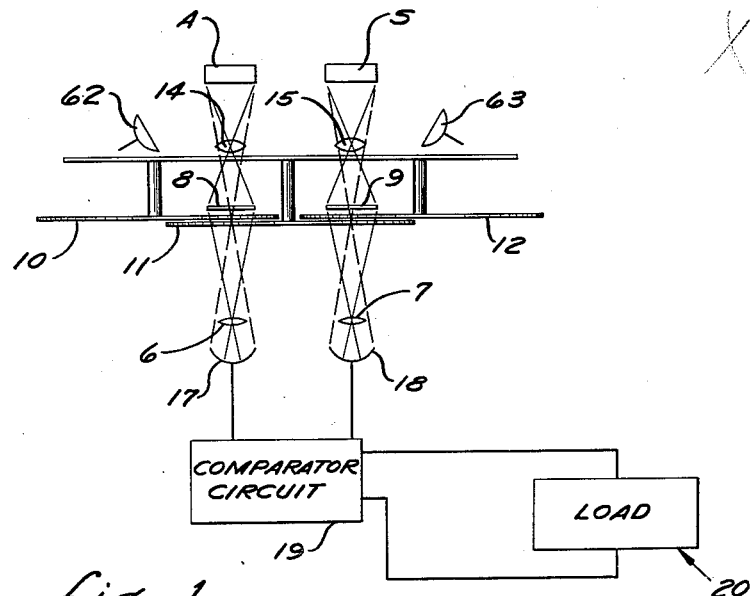
Figure 1 is a schematic diagram illustrating the operating principle of this invention.

In constructing a mechanism meeting the objects and purposes above set forth, there is provided, in general, a machine having a plurality, as three, of slotted rotating discs 10, 11 and 12 (Figure 1). A pair of suitable optical systems here indicated by the lenses 14 and 15, respectively, are mounted in proximity to the discs and are adapted to transmit light rays through the slots in the discs, the light rays thereupon striking and actuating photocells 17 and 18. The photocells are connected to any conventional comparator-type electric circuit 19 which is adapted to compare the outputs of the photocells 17 and 18. The output of the circuit 19 is connected to any suitable signal device or load 20 for actuation thereof upon unbalance in the output signals of the photocells.

In operation, a standard "S" is located so that the incident light rays reflected therefrom are transmitted through lens 15, and through the slots in the discs 11 and 12 to actuate photocell 18. The article "A" being inspected is located so that the incident light rays reflected therefrom are transmitted through lens 14 and through the slots in the discs 10 and 11 to actuate photocell 17. The outputs of photocells 17 and 18 are compared in the comparator circuit 19 and if they are varied from a predetermined relationship with respect to each other, the comparator circuit will transmit an impulse to the signal device or load 20. Since the outputs of photocells 17 and 18 are dependent upon the intensity of the light rays impinging thereon, any unbalance in the outputs of the photocells will indicate that there is a discrepancy between the standard and the test article being inspected. The signal device may warn the operator of the discrepancy so that steps can be taken to correct the cause of the discrepancy or it may be self-acting to remove the improper article from its position, as on a conveyor belt.

*Detailed description*

Discs 10, 11 and 12 are rotatably mounted on any suitable supporting structure such as plate 21. Each of the discs is shown as having a plurality of radially arranged slots formed therein, slots 22 being formed in disc 10, slots 23 being formed in disc 11 and slots 24 being formed in disc 12. While each disc is shown as having eight slots, it will be appreciated as the specification proceeds that the number of slots may be varied. Likewise, it is not necessary that discs 10 and 12 have the same number of slots as are formed in disc 11, provided only that the numbers of slots in discs 10 and 12 are equal to each other and are arranged in the same pattern.

Each of the discs is mounted for rotation on a rotatable shaft which in turn is mounted on the supporting plate 21, disc 10 being mounted on shaft 36, disc 11 being mounted on shaft 25 and disc 12 being mounted on shaft 38. Mounted on shaft 25 and adapted to be connected to a suitable source of power (not shown) is a bevel gear 26. Rotation of the bevel gear 26 by the power source causes rotation of shaft 25 and disc 11. Fixedly mounted on the shaft 25 for rotation therewith is a pinion 27. A first idler shaft 30 is rotatably mounted intermediate shafts 36 and 25 and has fixedly mounted therein a gear 28 meshing with pinion 27 and a second gear 31 of smaller diameter than the gear 28. Mounted on shaft 36 is a gear 34 which meshes with and is driven by gear 31. A second idler shaft 33 is mounted intermediate shafts 25 and 38 and has fixedly mounted thereon gear 29 meshing with pinion 27 and a smaller gear 32. Gear 35 is mounted on shaft 38 and is driven by gear 32. The gears 28 and 29, 31 and 32, 34 and 35 are similar in all speed controlling respects so that shafts 36 and 38 are rotated at exactly the same speed. The design of the above gear train is such that disc 11 rotates at a much faster speed, as from ten to fifty times faster, than the discs 10 and 12.

Figure 2:
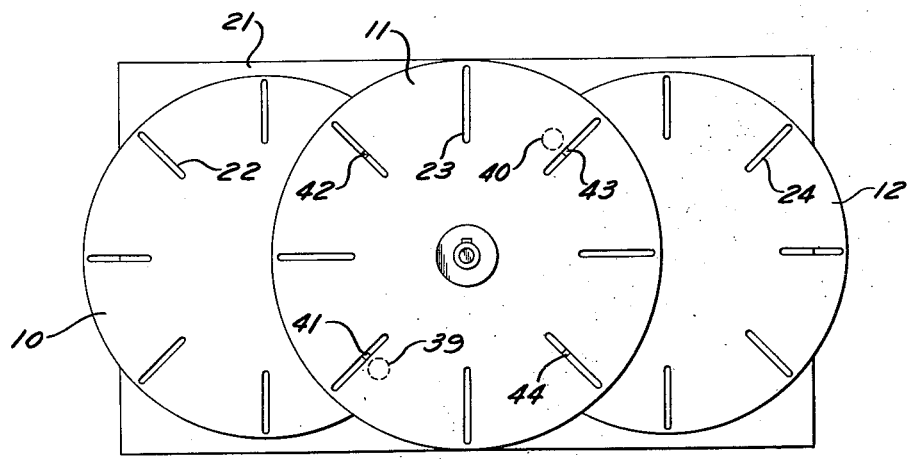
Figure 2 is a front view of the scanning portion of the inspection device.
Figure 3:
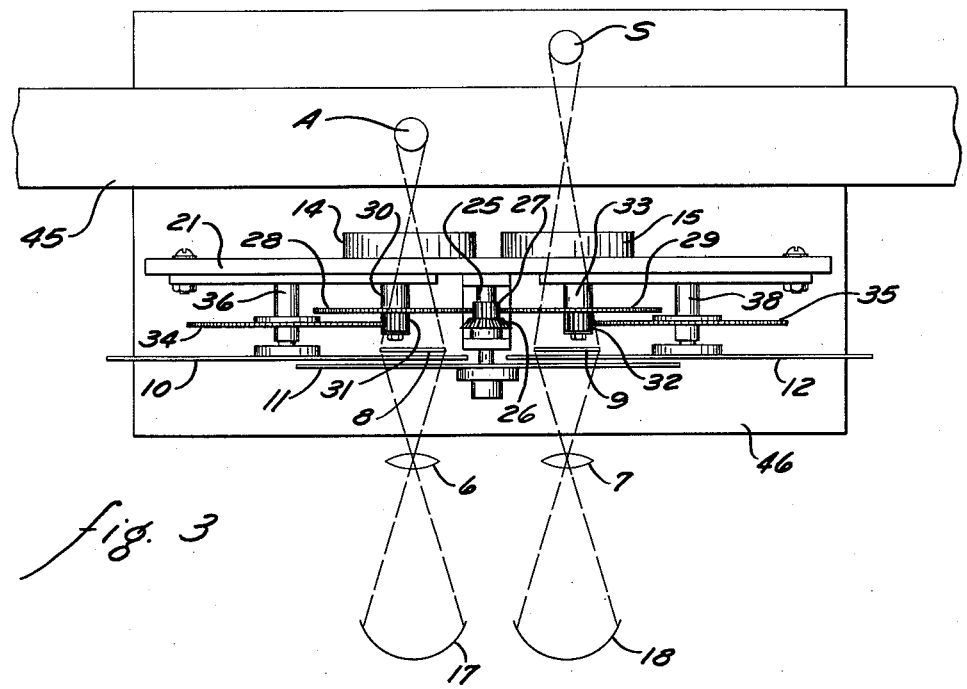
Figure 3 is a top view of the scanning portion of the inspection device.
Figure 4:
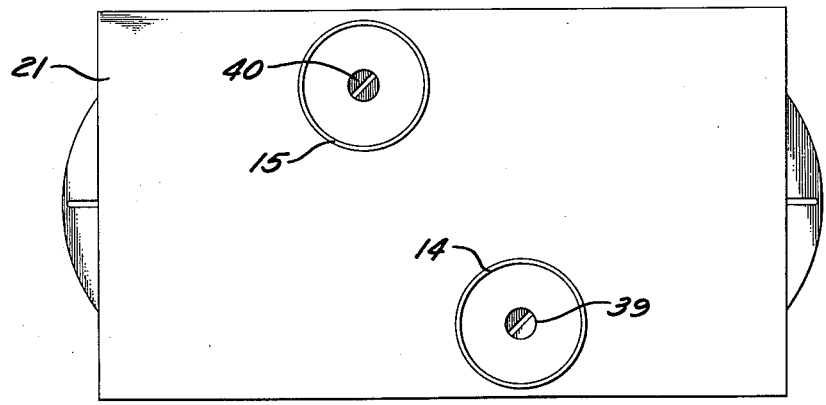
Figure 4 is a rear view of the scanning portion of the inspection device.

The discs are of such size, their respective slots are of such length and the discs are sufficiently overlapped that the slots in disc 11 each cross the paths of the slots in each of discs 10 and 12 twice and do so substantially perpendicularly with respect to each other. Therefore (Figures 2 and 5), four intersection zones 41, 42, 43 and 44 are formed where the paths of the respective slots cross. Two openings 39 and 40 are formed in the supporting plate 21 and are so located and of sufficient size that two intersection zones of the slots will be substantially aligned with said openings. However, it is not necessary in all cases that the openings be formed at the particular places indicated in the drawings. Rather, the openings may be placed at any of the places where the slot paths intersect and any combination of two openings aligned with two intersection zones will give a structure capable of fulfilling all the objects and purposes of this invention. Optical systems here schematically indicated by lenses 14 and 15 are mounted in alignment with the openings 39 and 40.

While a variety of specific arrangements will be recognized as possible, the preferred arrangement is further illustrated in Figure 1 wherein the optical systems 14 and 15 focus their respective images onto ground glass plates 8 and 9, which plates are placed immediately adjacent the rotatable discs and the images thus applied to the ground glass constitute the actual objects scanned by the discs. The light passing through said discs is received by the optical systems indicated by the lenses 6 and 7 and focused onto the photocells 17 and 18. It will be appreciated that the optical systems herein indicated may be mounted on any suitable supporting structure so long as they are in alignment with openings 39 and 40 and that any specific optical systems capable of focusing light as herein described may be used.

When the article A is stationary with respect to a base, as the floor, then the standard S, the lens, the rotational axes of the discs and the photocells should all be similarly stationary with respect to such base. But where the article A is mounted on a moving conveyor or assembly line 45, then the standard S, the lenses, the discs and the photocells may all be mounted on a suitable type of carriage reciprocating in a path parallel to that of the conveyor and whose speed in at least one direction of reciprocation is the same as that of the conveyor. The particular mechanism by which this is accomplished may take any of many forms but for purposes of further illustration two such forms are indicated hereinafter, in connection with Figures 8 and 9.

The standard and test articles are both illuminated in any convenient manner, as by lamps 62 and 63 and reflected light emanating therefrom will pass through the lenses 14 and 15. Properly selected beams thereof, selected by the scanning discs 10, 11 and 12 will then be imposed on the photocells 17 and 18.

Figure 5:
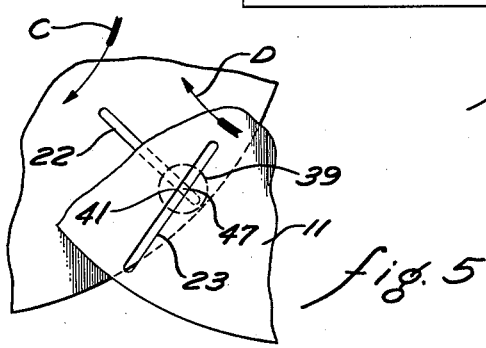
Figure 5 is a fragmentary view showing the slots in the respective rotating members facing each other.

The arrangement of the discs, the slots therein and the openings is such that the reflected incident light that is transmitted is in the form of a series of light rays which emanate from the entire surface of the article A. Referring to Figure 5 wherein both of discs 10 and 11 are assumed to be rotating in a clockwise direction as indicated by arrows C and D, respectively, slot 23 crosses slot 22 in front of opening 39 thereby forming a passage 47 at the intersection 41 through which the light rays pass via opening 39. Since slot 23 is moving much more rapidly than slot 22 it will sweep along the slot 22 and allow light rays to be transmitted through the passage 47. During the sweeping movement of slot 23, slot 22 will be relatively stationary. Thus, it will be seen that the reflected light rays are transmitted as a beam of light of cross-sectional area equal to that of the passage 47 sweeping across the opening 39 and thereby across the article in the direction D. While these beams will be slightly curved because of the actual movement of slot 22 during a single passage of a slot 23 across the slot 22, for the purposes of clarity they may be considered as being straight diagonal lines. As slot 22 continues to move relatively slowly in a clockwise direction others of the slots 23 in disc 11 will cross slot 22, sweep along the slot 22 and thereby allow passage of the light rays from the lens to the photocell. This in effect will provide a series of lines of light sweeping across the article to be inspected in the direction D, which lines will overlap to some extent so that a complete and thorough scanning of the article is made.

It will be appreciated that size of the openings 39 and 40 may be adjusted by well known means to allow the apparatus to be used for inspection of articles of various sizes. Similarly the distance between which the lenses and openings and the article may be varied in accordance with the size of the article. Likewise the speeds of rotation of the discs may be varied within practical limits by various means so that the inspection device may be adjusted for varying speeds and sensitivity of operation. The number and configuration of the slots in the respective discs and the size of the discs themselves may be varied to adapt the inspection device to the inspection of different articles, or to the use of the device at different speeds.

It will be understood that the standard S and the article A are so positioned with respect to the inspection device that the sweeping action of the discs will be operating on the same parts of the respective articles at a given time and will be sweeping the articles in the same direction with respect to each other.

This preferred embodiment therefore furnishes a device for scanning a pair of objects with a series of substantially parallel overlapping light rays to determine whether the articles are substantial duplicates of each other.

*Modification of scanning structure*

In some instances it is possible to eliminate one of the rotating discs 10 or 12 and use only two discs. For example, the openings 39 and 40 can be placed behind intersection zones 41 and 42 or behind intersection zones 43 and 44. In such case the third rotating disc, either 10 or 12, would be superfluous and could be removed.

In some instances it may not be necessary or even desirable to effect such a thorough and complete inspection of an article as is possible with the apparatus of the preferred embodiment of the invention. Accordingly, Figure 6 shows a modification in the structure of the inspection device particularly a modification in the structure of the discs and represents a device which is capable of meeting some, but not all, of the objects and purposes of this invention.

Plate 150 is provided with a pair of vertical slots 151. Plate 150 in this embodiment is mounted for relatively slow reciprocation, as by a rod 160 connected to a rotating wheel 161. A pair of discs 152 and 153 are mounted for rotation relative to the plate 150. A series of slots 154 and 155 are provided in said discs 152 and 153, respectively. The slots 154 and 155 in the discs are positioned so that they cross slots 151 to provide two passages 156 and 157 to permit passage of light rays therethrough. The passages 156 and 157 are positioned equal distances from the center of discs 152 and 153 and are positioned to allow viewing of corresponding parts of article A and standard S. Openings are provided behind the passages 156 and 157 as in the previously described embodiment to allow light to pass therethrough. The openings will be of sufficient size to cover the full extent of the sweep of intersections between the slots or any desired portion thereof.

Figure 10:
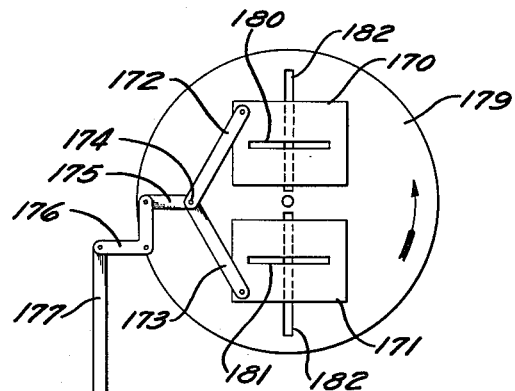
Figure 10 is a schematic view of another modification.
Figure 11:
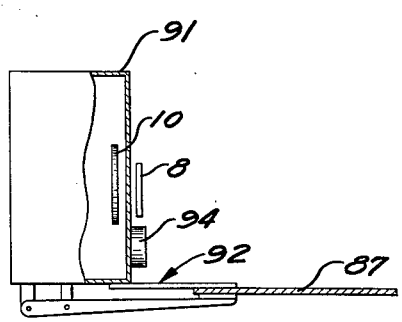
Figure 11 is a partially broken away right side view of the schematic form of the device shown in Figure 9.

A further modification of the invention is shown in Figure 10 in which two plates 170 and 171 are connected by links 172 and 173, respectively, to a movable pivot point 174. A further link 175 connects the pivot point to a bell crank lever 176 which in turn is connected by rod 177 to a rotating wheel 178. A disc 179 is mounted for rotation relative to the plates 170 and 171. Rotation of the wheel through the linkage above described effects equal and opposite movement of the plates toward and away from the center of the disc. Slots 180 and 181 in the plates 170 and 171, respectively, intersect the slots 182 in the disc 179. Openings will be provided behind each of the intersections and will be of sufficient area to cover the full area viewed by the intersections of said slots or any desired portion thereof.

The operation of the embodiments shown in Figures 6 and 10 is generally similar to that discussed in connection with the embodiment of Figures 1 to 5. It should be noted that the intersections of the slots should each lie an equal distance from the center of the rotating disc or discs so as to provide an equal sweep of both the article and the standard. The particular structure for effecting movement of the disc and the mountings for the various elements are not disclosed in detail since their construction will be obvious in view of the disclosure already made in connection with the preferred embodiment of this invention.

It will be seen that this modification provides a somewhat different type of scanning of the article and the standard, which type of scanning will be satisfactory for some kinds of articles and for some less rigorous inspection requirements.

It will be observed, particularly upon reference to Figures 5 and 6, that in all cases the slots are substantially perpendicular to each other at the time they form the passageway 47. However, it will be recognized that, while this position of the slots relative to each other is preferable, it is not essential and that any relationship will be acceptable providing only the slots are at a sufficiently large angle with respect to each other that the passageway 47 is of relatively small cross-sectional dimensions in all directions perpendicular to the axis of a beam of light passing therethrough and provided the cross-sectional shape of said passageway operating in association with the opening 39 is substantially the same as that of the passageway operating in association with the opening 40.

*Electric circuit*

The comparator circuit 19 may be of any suitable type. Although no claim is made to the details of the circuit, the following circuit has been found suitable for the desired purposes. It is described for illustrative purposes only and the invention is not limited to the use of any particular kind of circuit.

Referring now to Figure 7, there is shown the pair of photocells 17 and 18 connected to a pair of vacuum filled electric discharge devices 51 and 52. The cathode of the photocell 17 is connected through the potentiometer 104 to the control electrode of the vacuum tube 51 and the anode of the photocell 17 is connected through the potential source 56 to the cathode of the vacuum tube 51. The anode of the photocell 18 is connected through the potentiometer 107 to the control electrode of the vacuum tube 52 and the cathode of the photocell 18 is connected through the potential source 56 to the cathode of the tube 52. The anodes of said vacuum tubes are connected to each other through resistances 64 and 66 and their cathodes are connected together through the conductor 57. A junction point 67 between said last-named resistances is connected to a suitable trigger circuit 60 which circuit in turn actuates the winding 53 of a relay 54.

A small source 58 of D.C. power is provided between the cathodes of the vacuum tubes 51 and 52 and their respective control electrodes to provide a bias potential. A conductor 106 connects the junction point 67 to the conductor 108, which latter extends between the anodes of the respective photocells.

The trigger circuit 60 in this embodiment includes a vacuum tube 109 whose cathode is connected to the junction point 67 and whose control electrode is connected to a junction point 111 which in turn is connected through the rectifiers 112 and 113 to the anodes of the vacuum tubes 51 and 52. The anode of the vacuum tube 109 is connected through a capacitor 114 to the control electrode of a tube, as a thyratron 116. The negative side of a further source 117 of D.C. potential is connected to the cathodes of both the tube 116 and the tube 109 and the positive side of said source is connected through the relay winding 53 to the anode of the tube 116 and is connected through a suitable protective resistance 118 to the anode of the tube 109.

The contacts 59 of the relay 54 are normally open and are connected in series circuit with a source of signal power 61 and a suitable signal 62. It will be understood that this signal 62 may be of either visual or auditory nature or it may constitute an actuating device, such as a gate mechanism for guiding a rejected article off an assembly conveyor.

Thus, in operation, the battery 56 tends to cause a flow of current through the respective vacuum tubes 51 and 52. The potentiometers 104 and 107 are adjusted with respect to the bias potential 58 to block such flow or to permit only a small amount thereof. So long as the photocells 17 and 18 are equally energized, the potentials on the control electrodes of the vacuum tubes 51 and 52 are equal and the transmissiveness of said vacuum tubes remains equal. Thus, with resistances 64 and 66 of equal value, the potential between the points 67 and 111 will be at a level which is preselected to be sufficient to block, or substantially block, the vacuum tube 109. However, upon the unbalance in energization of either the photocells 17 or 18, by increasing energization or by decreasing the energization of either thereof, current will flow through one of them and thereby make the point 111 more positive with respect to the point 67 than when said vacuum tubes are in balance. This will permit the tube 109 to conduct and in a well known manner permit the thyratron 116 to conduct. This actuates the winding 53 of the relay 54 and thereby closes the contacts 59, resulting in actuation of signal 62.

Other circuits will be apparent to persons acquainted with apparatus of this general type. One particular preferred alternate circuit is shown in the co-pending application of Theodore Thomsen, assigned to the assignee of this application and entitled "Comparator Circuit Using Photo Multiplier Tubes," Serial No. 486,791, filed February 8, 1955, now Patent Number 2,842,672, issued July 8, 1958.

*Support mechanism for inspection head*

Figure 9:
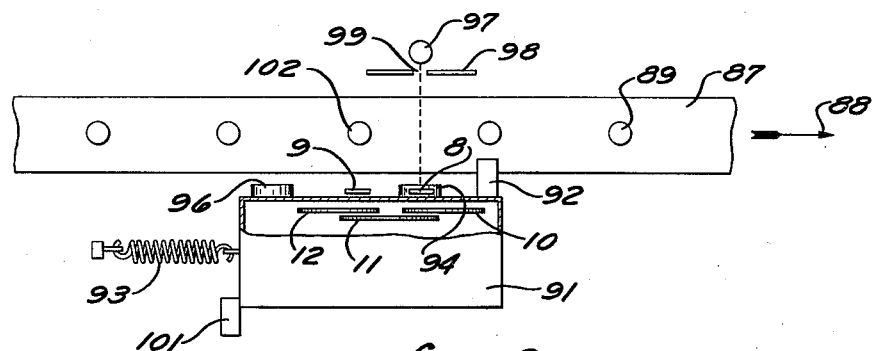
Figure 9 is a schematic drawing indicating another form of device for causing the inspection device to move simultaneously with the conveyor belt.

While the particular mechanism by which the inspection head is caused to travel with a conveyor belt, where a conveyor belt is involved, forms no part of the basic combination comprising the invention, Figures 8 and 9 are provided to indicate somewhat schematically two broad approaches to this problem by which the apparatus may be operated.

Figure 8 assumes the use of a large conveyor belt, or chain, for transporting at a relatively slow rate of speed large objects such as automobile engines on an engine assembly line. In such a belt it is customary to utilize fixed locating pins on the belt and to place the engines in exactly predetermined positions with respect thereto, such locating pins being here indicated by the posts 71, 72 and 73 placed at spaced intervals along the length of the belt 74. A series of notches 71a, 72a and 73a are placed in association with the said posts in exactly predetermined relationship thereto.

The inspection device 76 is schematically shown as supported by wheels on a surface 77 for movement parallel to the direction of motion of the conveyor 74. A leaf-spring element 78 is affixed to the body of the inspection device 76 and is provided with an engaging finger 79 for entering into the several notches along the bottom of the conveyor. A release finger 81 extends forwardly of the engaging finger 79 and is adapted for engagement with the cam 82 which is supported by the post 83 on the surface 77. Any convenient device, as a spring 84, is provided for constantly urging the inspection device 76 in a direction opposite to that of the conveyor motion, the latter being indicated by the arrow 86. Thus, when the engaging finger 79 enters into the notch 72a, the inspection device 76 will be properly aligned for inspection of the article A located on the conveyor 74. It will move with the conveyor until the finger 81 is engaged by the cam 82 and the engaging finger 79 thus released from the notch 72a. The spring 84 will then move the inspection device 76 leftwardly until the engaging finger 79 encounters the next leftward notch, here the notch 71a, whereupon the inspection device 76 will be arranged for inspection of the next article, as the article B, and the cycle will repeat. The standard S is in a predetermined position with respect to the inspection device so that the same portion of the test article and the standard is scanned at the same time as shown in Figure 9. The standard S will be mounted on the same or a similar carriage as the inspection device so that it moves therewith and always occupies the same position relative to the inspection device.

Where the articles being inspected are of such character that it is not convenient to arrange them in a predetermined position on the conveyor belt, other apparatus for effecting simultaneous movement between the conveyor belt and the inspection device will be required. Referring to Figure 9, there is shown a conveyor belt 87 moving in the direction indicated by the arrow 88 and carrying a plurality of articles 89 thereon. Said articles 89 may be spaced thereon somewhat erratically, provided only there is a minimum distance therebetween as indicated hereinafter. Here the inspection device 91 includes a gripping member 92 which upon suitable actuation by circuitry, not shown, within the inspection device 91 will grip the belt 87 and cause the inspection device 91 to move therewith. A spring 93, or other convenient device, causes the inspection device 91 to return leftwardly to the initial position upon the release of the gripping device 92.

A photocell 94 is electrically connected to the gripping device 92 for causing it to engage said belt upon energization of said photocell 94 and a further photocell 96 is electrically connected to the gripping device for causing it to disengage said belt upon energization of said photocell 96.

The light source 97 is arranged with respect to a shield 98 having therein a very small opening 99 in such a manner that the beam passing through said opening 99 will fall upon the photocell 94 in one position of the inspection device 91 along the length of the belt 87 and said light beam will fall upon the photocell 96 in another position of said inspection device 91 along the length of the belt 87.

A stop 101 limits the movement of the inspection device 91 in response to the urging of the spring 93. Said stop is so positioned with respect to the location of the light source 97 that when the inspection device 91 is against said stop the light beam passing the opening 99 will energize the photocell 94. This presets a suitable circuit so that upon the cutting of said light beam by an article, as the article 102, the clamp 92 is caused to engage the belt 87. This effects movement of the inspection device 91 simultaneously with said belt and the inspection discs 10, 11 and 12 are properly positioned for inspecting the article 102 and comparing it with the standard. Preferably, in this case, the ground glass element 9 which is shown in Figure 1 as associated with the standard will be the standard and take the form of a positive transparency of the article being inspected and which is illuminated either by the light normally in the room or by a separate source of illumination not shown. The standard is secured by any suitable means (not shown) to the frame of the inspection device 91. As soon as photocell 96 is energized by the light beam passing the opening 99, the clamp 92 is released and the spring 93 returns the inspection device 91 to its beginning point against the stop 101, and the cycle repeats.

*Operation*

The operation of the foregoing described apparatus has been substantially indicated throughout the description above set forth but will be hereinafter reviewed for purposes of completeness.

Referring now to the three disc arrangement, above indicated as preferred, the discs will be set into operation from any convenient source and with the center disc rotating at a speed several, as ten, times that of the other two discs. The standard against which the articles being inspected are to be compared is placed in the proper position with respect to the lens 15, or with respect to an optical system herein schematically represented by the lens 15, and caused to be illuminated from the light source 63.

The article to be inspected is placed in front of the lens 14, or in front of the optical system herein schematically represented by the lens 14, and is illuminated by the source 62. The discs are synchronized with respect to each other and the standard and test article are so positioned that identical portions of the two articles will be scanned at a given instant. The simultaneous use of two of the slots 23 in the disc 11, and the positive connection of the discs 10 and 12 with disc 11 will insure that when the openings 47, formed by the intersection of respective cooperating pairs of slots, are once synchronized between the standard and the test article, such synchronization will be maintained accurately over long periods of operation.

Thus, with the discs rotating and the sources of illumination supplying illumination to the test article and to the standard, corresponding portions of the light being reflected from said test article and from said standard will be selected by the discs and corresponding beams of which illumination will be permitted to pass through the said openings 47, through the respective openings 39 and 40 and onto the photocells 17 and 18.

The operation of the electric circuit will be readily understood. With the photocells 17 and 18 illuminated in exactly equal magnitudes, or illuminated in magnitudes which bear a predetermined relationship with respect to each other, the valves 51 and 52 carry the same, or predeterminedly proportional, charges on the respective control electrodes and are therefore of the same, or predeterminedly proportional, resistance with respect to each other. For the purpose of further illustration it will be assumed that the normal condition is that said valves introduce equal resistance into the system. So long as said valves introduce equal resistance into the system, and subject to the proper calibration by the potentiometers 104 and 107, the power source 56 will impose sufficient potential difference between the points 67 and 111 to prevent material flow through the tube 109. Thus, no current will flow through the trigger circuit 60 and the contacts will remain in normal open condition. However, upon change in output in either of the photocells 17 or 18, so that either of them is less than the other, then the resistance interposed into the system by the respective vacuum tubes 51 and 52 will be changed and the potential difference between the points 67 and 111 will diminish sufficiently to permit a flow of current through the tube 109 and thereby make more positive the potential of the control electrode of the tube 116. This will effect a flow of current through the winding 53, will close the relay contacts 59 and actuate the signal 62.

Thus, the circuit will actuate the relay upon either an addition to, or a deletion from, the test article with respect to the standard. Thus, where the device is used for checking an automobile engine assembly line and a carburetor is omitted from a given engine assembly, the photocell 17 will be momentarily actuated or energized at a magnitude less than the corresponding energization of the photocell 18 and the signal will be operated. Likewise, if there is some part appearing on the test article which does not appear on the standard, then the output of the photocell 17 will be larger than the corresponding output of the photocell 18 and the signal will be similarly operated.

Other circuits will be apparent, and are well understood in the art, by which a different type of signal will be given to denote whether the output of the photocell 17 is greater or less than the corresponding output of the photocell 18 at a given instant.

While the standard throughout has been referred to as another article of the same nature as that being inspected, or as a photograph thereof, it will be apparent in view of the foregoing that such standard may take other forms wherein the standard will be light transmissive, as a positive transparency, light reflective, as a positive photographic transparency of the device being inspected, or it may itself be the source of illumination for the photocell associated therewith.

It will be apparent that a large number of modifications may be made in the specific apparatus and the circuit by which the principles of the present invention are utilized, particularly the electric circuit portion thereof, and the scope of the hereinafter appended claims will be understood to include such variations excepting as the terms of said claims expressly require otherwise.

I claim:

1. An apparatus for detecting differences between an article and a standard, the combination comprising: a pair of photocells, lenses directing reflected light rays in separate paths from said article to one of said photocells and from said standard to the other of said photocells, means connected to said photocells for comparing the intensity of light rays striking said photocells, a first plate mounted between said lenses and said photocells, said first plate being provided with a plurality of elongated slots, a second plate mounted in close proximity to and for movement relative to said first plate, said second plate having a plurality of openings therein, said second plate being so mounted that said openings intersect the path of said slots at two points and move along said slots during the movement of said second plate, the intersection of the slots and said openings forming a pair of passages which move during the movement of said second plate with respect to said first plate, one of said passages being aligned with the path between one of said lenses and one of said photocells, the other of said passages being aligned with the path between the other of said lenses and the other of said photocells.

2. An apparatus as in claim 1 wherein said first and second plates are rotatable discs, said elongated slots in the first disc being radially disposed, the openings in said second disc being radially disposed elongated slots, shafts supporting said discs for rotation, said shafts being parallel and so spaced that the path of the slots in the first and the path of the slots in the second disc intersect, the slots in the second disc moving along the slots in the first disc as said second disc moves relative to the first disc.

3. A device for detecting discrepancies between an object and an apparent facsimile thereof, said object and facsimile being illuminated, comprising: a pair of light sensitive elements; optical means directing reflected illumination in separate paths from said object onto one element and from said facsimile onto the other element; a comparator circuit connected to said elements and responsive to simultaneous, non-proportional variations in the intensity of illumination in said separate paths; a first opaque plate having a plurality of elongated openings therethrough and means causing said openings to pass through said paths at uniform, identical rates and substantially normal to the axis of said paths; second and third opaque plates each having a plurality of elongated openings therethrough; means causing the openings in said second plate to intersect one of said paths and the openings in said third plate to intersect the other path at uniform, identical rates, the openings in said second and third plates overlapping the openings in the first plate.

4. A device for detecting apparent differences in a pair of illuminated, similar objects, comprising: a base member having a pair of spaced, masked apertures; a pair of light sensitive elements, one being aligned with each aperture; a comparator circuit connected to said elements and responsive to non-proportional, simultaneous variations in the intensity of the illumination striking said elements; a first disc rotatably mounted upon said member and blocking the path between each said aperture and its aligned element, said disc having a plurality of equally spaced, radially disposed, elongated openings therethrough, said openings intersecting each said path in the same manner; second and third discs rotatably mounted upon said member substantially within a single plane parallel with said first disc and perpendicular to said paths, said second and third discs each having a plurality of equally spaced, radially disposed, elongated openings therethrough, one of said paths being intersected by the openings in said second disc and the other path being intersected by the openings in said third disc in the same manner, and means for rotating said second and third discs at the same speed and said first disc at a relatively high speed.

5. In apparatus for detecting differences between an article and a standard, the combination comprising: a pair of light sensitive electric elements; optical elements directing reflected light rays in separate paths from said article to one of said light sensitive elements and from said standard to the other of said light sensitive elements; a first scanning means mounted between said light sensitive elements and said article and said standard, said first scanning means including at least one pair of elongated slots, each slot in the pair intersecting the path between one of said standard and article and the light sensitive element associated therewith, the respective intersections occurring at the same regions of each path; said slots in the first scanning means being movable across said paths; a second scanning means in close proximity to said first scanning means and between said light sensitive elements and said article and said standard, said second scanning means having at least a pair of slots therethrough, each slot of said pair of slots in said second scanning means being positioned for simultaneously overlying, and extending across one slot in said pair of slots in said first scanning means, the intersection of one slot in said second scanning means and one slot in said first scanning means providing a path for light rays from said article to one of said light sensitive elements and the intersection of the other slot in said second scanning means and the other slot in said first scanning means providing a path for light rays from said standard to the other light sensitive element; and means for moving said second scanning means with respect to said paths and with respect to said first scanning means so that said slots in said second scanning means overlie successive portions of the slots in said first scanning means.

6. The combination of claim 5 wherein said first scanning means includes a pair of rotatable plates mounted adjacent each other in substantially coplanar relationship, said pair of plates being identical and each having a series of radially directed slots therein; said second scanning means including a third rotatable plate having its axis of rotation parallel with, between, and equally spaced from, the axis of rotation of said pair of plates, said third plate overlying adjacent portions of said pair of plates and having a series of symmetrically arranged, radially directed slots therethrough; and means for rotating said pair of plates at the same speed and in the same direction, and for rotating said third plate at a higher speed.

7. An apparatus for detecting differences between an article and a standard, comprising: a pair of radiation sensitive electric elements; optical elements directing reflected radiation in separate paths from said article to one of said radiation sensitive elements and from said standard to the other of said radiation sensitive elements; means connected to said radiation sensitive elements for comparing the intensity of radiation striking said radiation sensitive elements; first scanning means mounted between said radiation sensitive elements and said article and standard, said first scanning means having a plurality of elongated apertures; second scanning means mounted in close proximity to said first scanning means, said first and second scanning means being movable relative to each other, said second scanning means having a plurality of elongated openings, said openings in said second scanning means intersecting and sweeping along at least two of said apertures in said first scanning means when said second scanning means moves relative to said first scanning means to provide at least two passages which move during the relative movement of said first and second scanning means, one of said passages being aligned with one of said paths for reflected radiation and another of said passages being aligned with the other of said paths for reflected radiation.

References Cited in the file of this patent

UNITED STATES PATENTS

| | | |
|---|---|---|
| 1,636,235 | Knowles | July 19, 1927 |
| 1,842,759 | Malm | Jan. 26, 1932 |
| 1,894,944 | Donle | Jan. 24, 1933 |
| 2,026,330 | Tauschek | Dec. 31, 1935 |
| 2,114,351 | Lindner | Apr. 19, 1938 |
| 2,145,591 | FitzGerald | Jan. 31, 1939 |
| 2,184,161 | Stockbarger et al. | Dec. 19, 1939 |
| 2,470,877 | Stuland | May 24, 1949 |
| 2,626,989 | Brown | Jan. 27, 1953 |

FOREIGN PATENTS

| | | |
|---|---|---|
| 29,436 | Great Britain | of 1913 |
| 1,035,812 | France | Apr. 22, 1953 |